(12) United States Patent
Ferrando et al.

(10) Patent No.: US 11,101,534 B2
(45) Date of Patent: Aug. 24, 2021

(54) GUIDING SET OF RADIO-ELECTRIC WAVES AND ANTENNA COMPRISING SUCH A SET

(71) Applicant: THALES, Courbevoie (FR)

(72) Inventors: Nicolas Ferrando, Toulouse (FR); Olivier Saint-Martin, Toulouse (FR)

(73) Assignee: THALES, Courbevoie (FR)

( * ) Notice: Subject to any disclaimer, the term of this patent is extended or adjusted under 35 U.S.C. 154(b) by 114 days.

(21) Appl. No.: 16/565,162

(22) Filed: Sep. 9, 2019

(65) Prior Publication Data

US 2020/0091576 A1    Mar. 19, 2020

(30) Foreign Application Priority Data

Sep. 13, 2018   (FR) ..................................... 18 00955

(51) Int. Cl.
| | | |
|---|---|---|
| *H01P 3/12* | (2006.01) | |
| *G02B 6/42* | (2006.01) | |
| *H01P 1/207* | (2006.01) | |
| *H01P 3/123* | (2006.01) | |
| *H01Q 3/04* | (2006.01) | |
| *H01Q 13/18* | (2006.01) | |
| *H01Q 21/00* | (2006.01) | |
| *H01P 5/02* | (2006.01) | |

(52) U.S. Cl.
CPC ............ *H01P 3/121* (2013.01); *G02B 6/4291* (2013.01); *H01P 1/207* (2013.01); *H01P 3/123* (2013.01); *H01P 5/024* (2013.01); *H01Q 3/04* (2013.01); *H01Q 13/18* (2013.01); *H01Q 21/005* (2013.01); *H01Q 21/0062* (2013.01)

(58) Field of Classification Search
CPC ........... H01P 3/121; H01P 5/024; H01P 5/082
USPC .................................................. 333/208–212
See application file for complete search history.

(56) References Cited

U.S. PATENT DOCUMENTS

| | | |
|---|---|---|
| 2,588,103 A | 3/1952 | Fox |
| 4,283,727 A | 8/1981 | Martel et al. |
| 4,675,633 A | 6/1987 | Young |
| 2005/0128028 A1 | 6/2005 | Sanchez et al. |
| 2009/0303145 A1* | 12/2009 | Shijo ....................... H01P 3/121 |
| | | 343/767 |

OTHER PUBLICATIONS

French Search Report dated May 15, 2019 issued in French Patent Application No. 18 00955.

* cited by examiner

*Primary Examiner* — Rakesh B Patel

(74) *Attorney, Agent, or Firm* — Arent Fox LLP

(57) ABSTRACT

The present invention relates to a guiding set for radio-electric waves comprising a pair of waveguides made up of a first waveguide and a second waveguide forming successive segments of a same transmission way for the radio-electric waves.

The set is characterized in that it further comprises a connecting piece comprising two plates arranged opposite one another while defining an inner space between them, and delimiting means delimiting, in the inner space, a radio-electric wave transmission channel, the transmission channel emerging on the one hand on the first waveguide and on the other hand on the second waveguide.

8 Claims, 2 Drawing Sheets

GUIDING SET OF RADIO-ELECTRIC WAVES AND ANTENNA COMPRISING SUCH A SET

CROSS-REFERENCE TO RELATED APPLICATIONS

This application claims priority to French Patent Application No. 18 00955, filed on Sep. 13, 2018. The disclosure of the priority application is incorporated in entirety herein by reference.

FIELD OF THE INVENTION

The present invention relates to a set for guiding radio-electric waves.

The present invention also relates to an antenna comprising such a set.

The invention proposes to resolve the problems of difference in thermal expansion coefficients in a system conducting radio-electric waves. The invention is thus particularly interesting in the aerospace field, where considerable temperature variations create strong thermal expansions. This is in particular the case for systems comprising waveguides, for example antennas on board satellites.

BACKGROUND OF THE INVENTION

Generally, when a system is subject to strong temperature variations, so as not to generate excessive mechanical constraints on the structures, it is known to use temperature-stable materials, such as carbon or ceramic.

However, these materials remain unsuitable for radio-electric waveguides, which require conductive materials. Most often, these guides are made from aluminum.

Thus, in systems incorporating both a structure whose dimensions are substantially invariable and waveguides whose dimensions are subject to the temperature variation, the latter must be designed so as to account for their expansion, which can sometimes reach several centimeters in the wave guiding direction.

To that end, it is known in the state of the art to use flexible guides and/or many relaxation loops making it possible to "absorb" the expansions.

However, these solutions make the routing of the radio-electric waves within the system particularly complex, in particular by generating additional lengths of the waveguides. Thus, in some cases, this may limit the radio-electric and/or thermal performance of the system. Furthermore, this can limit the mechanical performance of the system defined by the mechanical behavior of the antenna and its mass.

Indeed, such routing can deteriorate the radio-electric performance of the system through insertion losses or ohmic losses. Furthermore, it can deteriorate the mechanical performance of the system by adding additional mass. It can also deteriorate the thermal performance of the system by adding additional energy to be dissipated in particular following ohmic losses.

Lastly, such routing makes it difficult to design the system, as well as to manufacture it.

SUMMARY OF THE INVENTION

The present invention aims to considerably simplify the routing of radio-electric waves in a system experiencing major thermal variations, and therefore to resolve the aforementioned problems.

To that end, the invention relates to a set for guiding radio-electric waves, comprising a pair of waveguides made up of a first waveguide and a second waveguide forming successive segments of a same transmission way for the radio-electric waves.

The set further comprises a connecting part comprising two plates arranged opposite one another while defining an inner space between them; delimiting means delimiting, in the inner space, a radio-electric wave transmission channel, the transmission channel emerging on the one hand on the first waveguide and on the other hand on the second waveguide.

According to other advantageous aspects of the invention, the guiding set comprises one or more of the following features, considered alone or according to all technically possible combinations:

- the second waveguide is able to slide along the transmission channel with play;
- the first waveguide is secured to the connecting part;
- the delimiting means are formed from a plurality of studs extending transversely between the two plates;
- the studs are arranged in at least two rows, the transmission channel being formed between these rows;
- each of the first waveguide and the second waveguide is inserted between said rows of studs;
- on each side of the transmission channel, the studs are arranged in at least two rows extending in parallel directions;
- the delimiting means are secured to at least one of the plates and are spaced apart from one another; and
- it further includes another pair of waveguides similar to said pair of waveguides and in that the delimiting means delimit, in the inner space, a transmission channel for each pair of waveguides.

The present invention also relates to an antenna comprising such a guiding set for radio-electric waves.

BRIEF DESCRIPTION OF THE DRAWINGS

These features and advantages of the invention will appear upon reading the following description, provided solely as a non-limiting example, and done in reference to the appended drawings, in which.

DETAILED DESCRIPTION OF THE INVENTION

Figure 1:
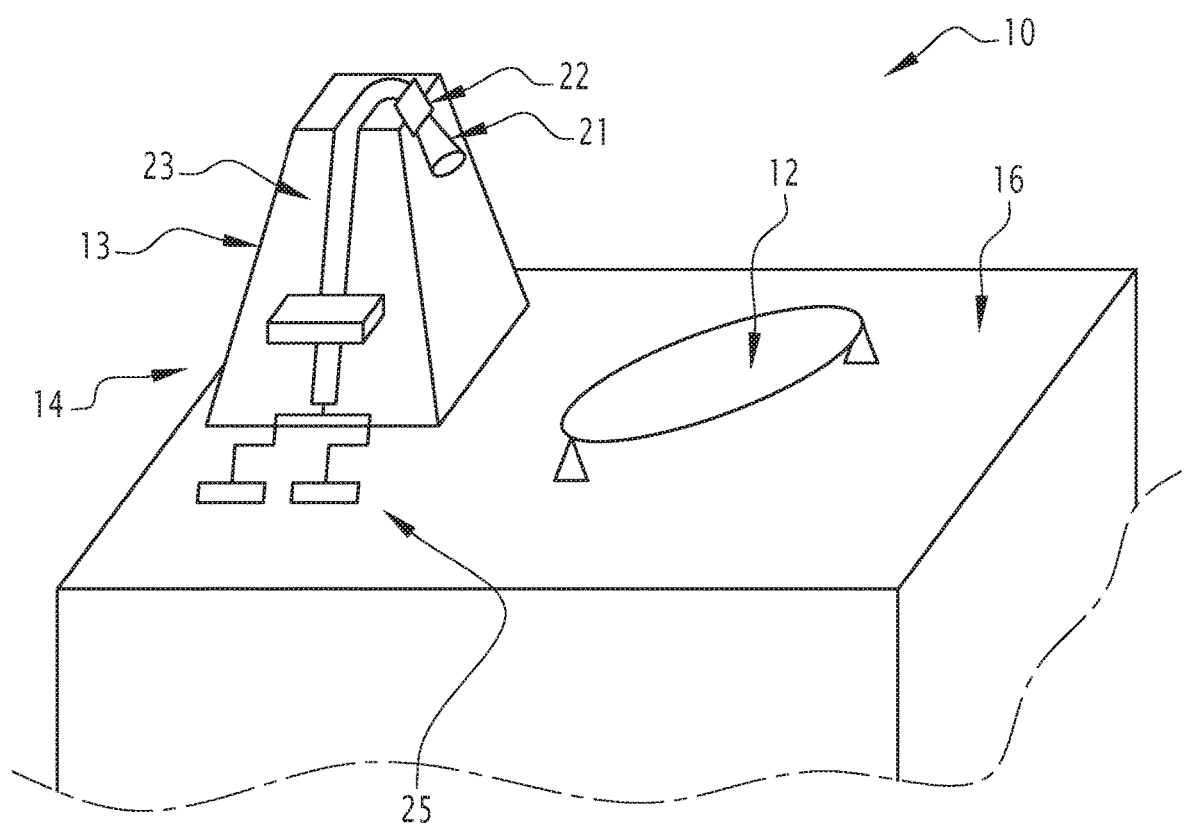
FIG. 1 is a schematic illustration of and antenna according to the invention.

The antenna 10 of FIG. 1 is for example a so-called "Earth-facing" antenna on board a satellite.

Thus, in a manner known in itself, such an antenna 10 comprises a reflector 12, a support 13 and an assembly 14 for sending/receiving radio-electric waves.

The reflector 12 is for example arranged on a surface 16 of the satellite oriented toward the Earth's surface.

The support 13 ensures the fastening of the transceiver assembly 14 to the satellite. This support 13 is for example made from a material whose dimensions are substantially in variable when variations occur in the temperature.

The transceiver assembly 14 is arranged on the support 13 and in particular comprises a horn 21 for sending/receiving radio-electric waves arranged opposite the reflector 12, a radio-electric exciter 22 connected to the horn 21 and a guiding set 23 connecting the radio-electric exciter 22 to a payload 25 of the satellite.

The reflector 12, the horn 21 and the radio-electric exciter 22 are known in themselves and will not be explained in detail hereinafter.

Figure 2:
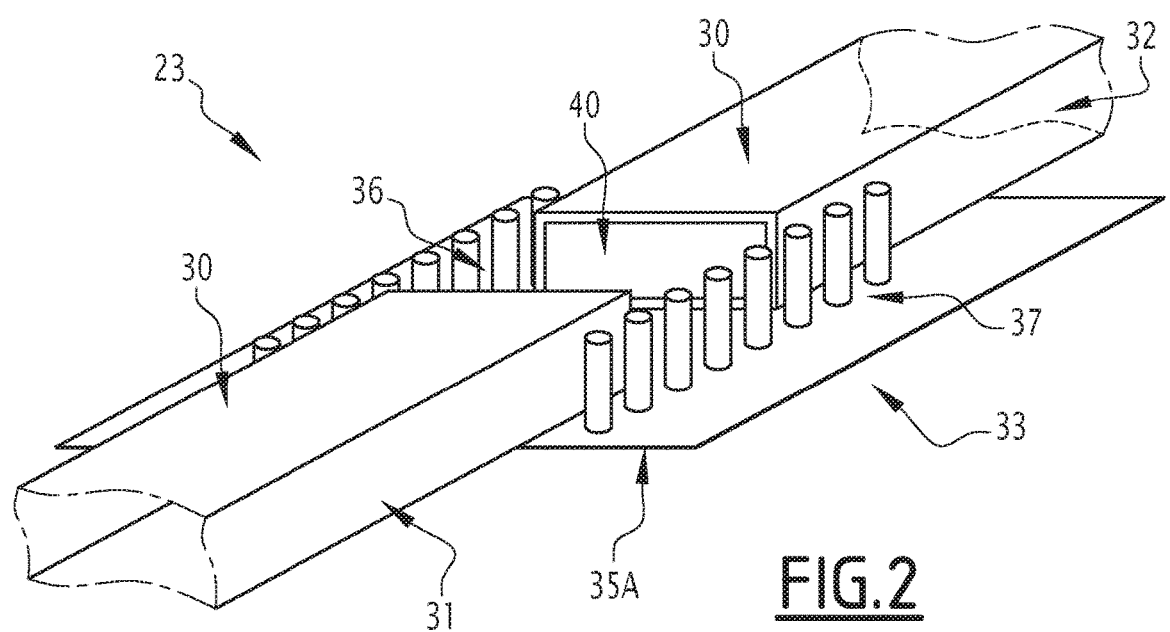
FIG. 2 is a partial perspective view of a guiding set according to a first embodiment of the invention.
Figure 3:
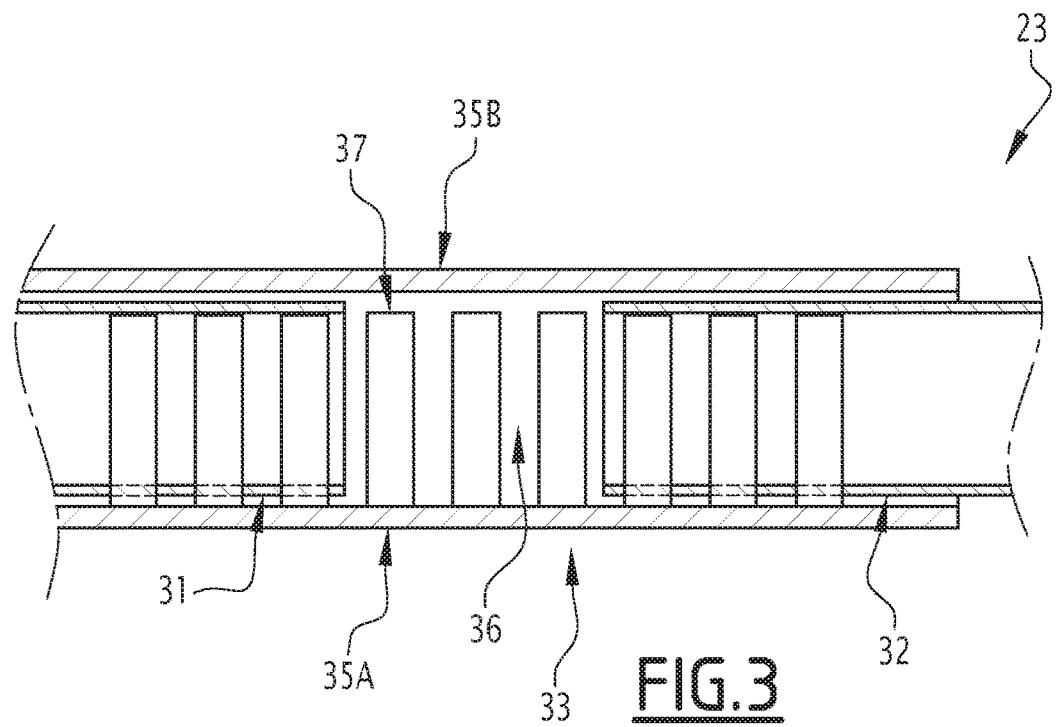
FIG. 3 is a side view of the guiding set of FIG. 2.

The guiding set 23 according to a first embodiment of the invention is illustrated in detail in FIGS. 2 and 3.

According to this first embodiment, the guiding set 23 forms a single transmission way for the radio-electric waves. This transmission way makes it possible to transmit radio-electric waves from the payload 25 of the satellite to the radio-electric exciter 22 in order to be sent via the horn 21 or vice versa, radio-electric waves received by the horn 21 and the radio-electric exciter 22 to the payload 25 of the satellite.

In reference to these FIGS. 2 and 3, the guiding set 23 comprises a pair of waveguides 30 made up of a first waveguide 31 and a second waveguide 32, and a connecting piece 33 of these waveguides 31, 32.

The first waveguide 31 and the second waveguide 32 form successive segments of a same transmission way for the radio-electric waves. They are for example made from metal, such as aluminum, and for example have a same shape in cross-section. This shape for example corresponds to a rectangle.

In the example illustrated in FIG. 1, the first waveguide 31 is connected to the payload 25 of the satellite and the second waveguide is connected to the radio-electric exciter 22.

However, in the general case, the first waveguide 31 and/or the second waveguide 32 can be connected to at least one other waveguide optionally via a connecting piece similar to the connecting piece 33.

Furthermore, according to one exemplary embodiment, the first waveguide 31 is part of the payload 25 of the satellite or any final piece on which the corresponding transmission way emerges. In such a case, the corresponding connecting piece connects the second waveguide to this payload or to this final piece.

Similarly, according to one exemplary embodiment, the second waveguide 32 is part of the radio-electric exciter 22 or any other initial piece from which the corresponding transmission way extends.

The connecting piece 33 is for example made from the same material as the waveguides 31, 32 and comprises two plates 35A, 35B arranged opposite one another while defining an inner space 36 between them. In FIG. 2, for simplicity reasons, only the plate 35A is visible.

The connecting piece 33 further comprises limiting means 37 forming, in the inner space 36, a transmission channel 40 for radio-electric waves.

The transmission channel 40 connects the two waveguides 31, 32 to one another. It therefore emerges on the one hand on the first waveguide 31 and on the other hand on the second waveguide 32.

In the described exemplary embodiment, at least one of the waveguides 31, 32, for example the second waveguide 32, is inserted with play into this channel 40 such that it can slide freely along the channel. In this case, the other waveguide, i.e., the first waveguide 31, is secured to the connecting part 33.

The length of the channel 40 on which the second waveguide 32 can slide freely is for example chosen based on the maximum expansion of this guide in the propagation direction of the waves. In particular, this length for example corresponds to the difference of the maximum length of this guide and its minimum length.

According to another exemplary embodiment, the two waveguides 31, 32 are able to slide along the channel 40 with play.

The transmission channel 40 for example has a shape in cross-section similar to that of the waveguides 31, 32, but with larger dimensions so that one and/or the other waveguide can slide freely along this channel 40.

The transmission channel 40 is formed using the "groove gap waveguide" technology.

Thus, in this case, the delimiting means 37 assume the form of studs arranged on either side of the channel 40.

In particular, as shown in FIG. 2, these studs are arranged transversely relative to the plates 35A, 35B in at least two rows, each row corresponding to a radio-electric barrier then forming a "wall" of the channel 40.

Within each row, the studs are for example spaced apart homogeneously.

Preferably, the studs are arranged in at least two rows on each side of the channel 40. These rows for example extend in parallel directions and make it possible to limit the leakage of the radio-electric waves passing through the channel 40. It is also possible to arrange the studs in at least three rows on each side of the channel 40 in order to have a necessary safety margin.

The studs are secured to one of the plates 35A, 35B, for example to the plate 35A, and for example form a single part integral with said plate.

Furthermore, the studs are spaced apart from the other plate by a predetermined distance.

The separating distance of the studs within each row, the separation of the rows from one another and the separation of the studs from the plate 35B are chosen based on frequencies and/or lengths of the radio-electric waves for which the corresponding transmission way of the guiding assembly 23 is designed. This choice is made using techniques known in themselves.

During operation, the antenna 10 undergoes considerable temperature variations. Thus, with the increase in temperature, the different components of the guiding assembly 23 expand. In particular, the first and second waveguides 31, 32 expand while increasing their respective lengths.

In this case, the second waveguide 32 slides along the transmission channel 40 toward the first waveguide 31, which makes it possible to "absorb" the expanded parts of these guides.

When the temperature decreases, the different components of the guiding set 23 narrow and the second waveguide 32 therefore slides along the channel 40 while moving away from the first waveguide 31.

Figure 4:
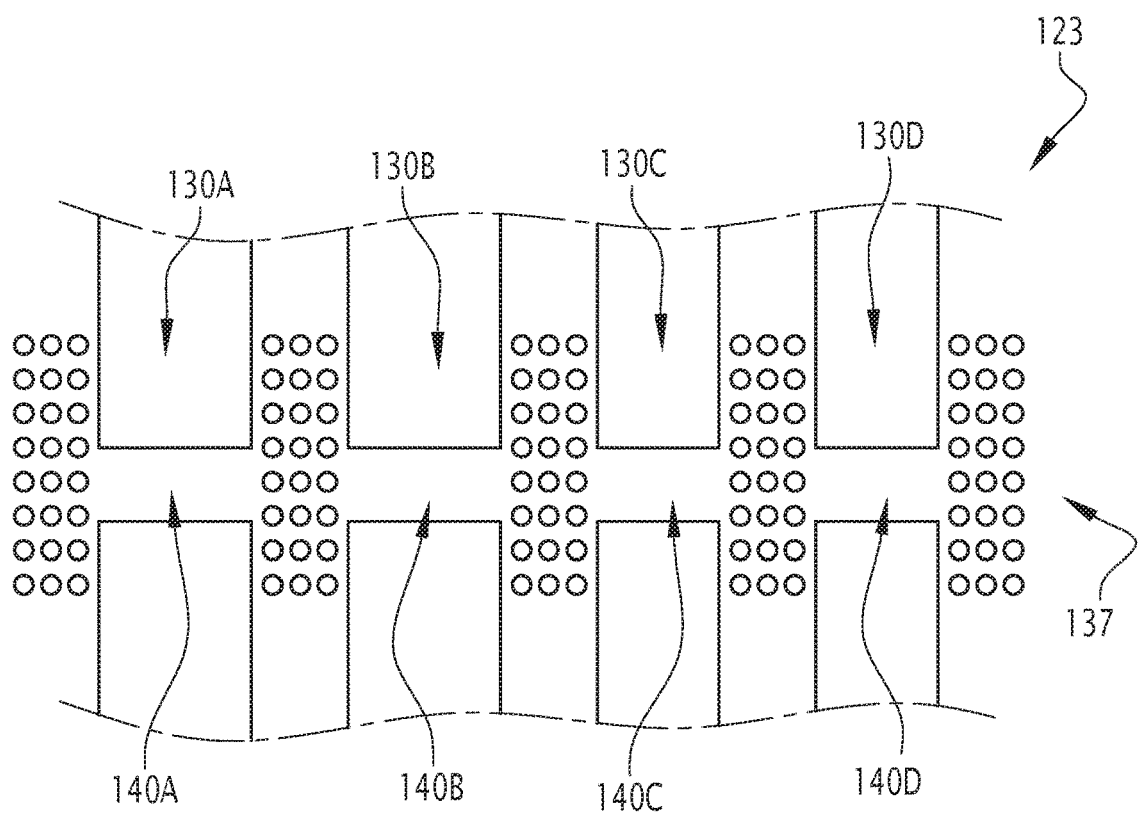
FIG. 4 is a partial top view of a guiding set according to a second embodiment of the invention.

FIG. 4 illustrates a guiding set 123 according to a second embodiment of the invention.

This guiding set 123 can be mounted in the antenna 10 of FIG. 1 in place of the guiding set 23 previously described.

The guiding set 123 according to the second embodiment differs from that according to the first embodiment solely in that it comprises several pairs 130A to 130D of waveguides similar to the pair 30 of the first and second waveguides 31, 32 previously described and in that it comprises delimiting means 137 delimiting a transmission channel 140A to 140D for each pair 130A to 130D.

Thus, in this case, the guiding set 123 forms several radio-electric wave transmission ways that are optionally designed to guide radio-electric waves of different types.

According to this embodiment, the delimiting means 137 still assume the form of studs arranged on either side of each transmission channel 140A to 140D.

Thus for example, as shown in FIG. 4, these transmission channels 140A to 140D are separated by studs arranged in three rows.

Of course, all of the variants described in connection with the first embodiment also remain applicable to the guiding set 123 according to the second embodiment.

Furthermore, it is evident that the guiding set described according to one of the embodiments of the invention remains usable not only in an antenna, but in any other system requiring routing of radio-electric waves and undergoing strong temperature variations.

One can then see that the present invention has a certain number of advantages.

First, the invention must allow routing of the radio-electric waves very simply, while accounting for the expansions of various components.

This makes it possible to avoid the use of specific relaxation loops and/or flexible guides and then makes the structure more compact and easier to design and place. Furthermore, this makes it possible to keep the radio-electric, thermal and mechanical performance intact.

The invention claimed is:

1. A guiding set for radio-electric waves, comprising:
   a pair of waveguides made up of a first waveguide and a second waveguide forming successive segments of a same transmission way for the radio-electric waves; and
   a connecting piece comprising:
      two plates arranged opposite one another while defining an inner space there-between; and
      delimiting means configured to delimit, in the inner space, a radio-electric wave transmission channel, the transmission channel being connected at one end thereof to the first waveguide and at another end thereof to the second waveguide, the delimiting means being formed from a plurality of studs extending transversely between the two plates,
   wherein the second waveguide is able to slide freely along the transmission channel.

2. An antenna comprising the guiding set for radio-electric waves according to claim 1.

3. The guiding set according to claim 1, wherein the first waveguide is secured to the connecting piece.

4. The guiding set according to claim 1, wherein the plurality of studs are arranged in at least two rows, the transmission channel being formed between the at least two rows.

5. The guiding set according to claim 4, wherein each of the first waveguide and the second waveguide is inserted between said rows of studs.

6. The guiding set according to claim 1, wherein on each side of the transmission channel, the plurality of studs are arranged in at least two rows extending in parallel directions.

7. The guiding set according to claim 1, wherein the delimiting means are solidary arranged to at least one of the two plates and are spaced apart from one another.

8. The guiding set according to claim 1, further including another pair of waveguides similar to said pair of waveguides, wherein the delimiting means is further configured to delimit, in the inner space, a transmission channel for each of the pair of waveguides and the another pair of waveguides.

* * * * *